Figure 1:
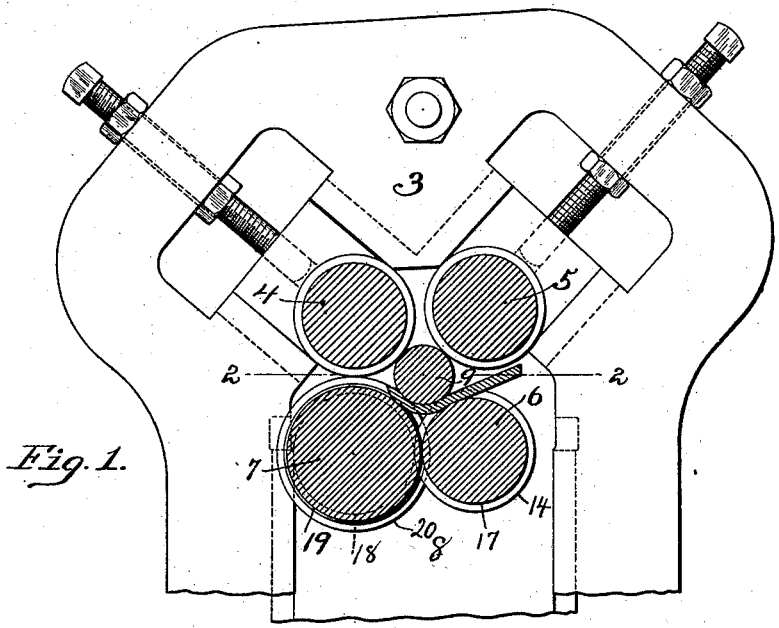

No. 653,870. Patented July 17, 1900.
G. W. LA VOO & T. J. BRAY.
ROLLS FOR WELDING COUPLING BLANKS.
(Application filed Oct. 31, 1899.)

(No Model.)

Witnesses:

Inventors:
George W. La Voo and
Thomas J. Bray,
By Kay & Totten
Attorneys.

UNITED STATES PATENT OFFICE.

GEORGE W. LA VOO AND THOMAS J. BRAY, OF PITTSBURG, PENNSYLVANIA, ASSIGNORS TO THE NATIONAL TUBE COMPANY, OF SAME PLACE AND NEW YORK, N. Y.

ROLLS FOR WELDING COUPLING-BLANKS.

SPECIFICATION forming part of Letters Patent No. 653,870, dated July 17, 1900.

Application filed October 31, 1899. Serial No. 735,363. (No model.)

*To all whom it may concern:*

Be it known that we, GEORGE W. LA VOO and THOMAS J. BRAY, residents of Pittsburg, in the county of Allegheny and State of Pennsylvania, have invented a new and useful Improvement in Rolls for Welding Coupling-Blanks; and we do hereby declare the following to be a full, clear, and exact description thereof.

Our invention relates to apparatus for the welding of rings and like articles—such as ordinary metal rings, bands, pipe-couplings, thread-protectors, &c.—its object being to provide a machine for the welding of rings of small diameter, the invention being an improvement upon an invention set forth in an application for patent filed by us of even date herewith, Serial No. 735,362. In the forming of small rings, such as small pipe-couplings, in order to obtain the necessary strength of roll it is found desirable to employ rolls of such size that it is difficult to arrange more than four rolls around the mandrel on which the blanks are welded, and when only four rolls are used and one of said rolls is made with depressions to receive the flanges of one of the other rolls, as described in said application, it is found that such mandrel is liable to sag to one side against the roll having depressions to receive the flanges of the other roll, as above described, because it has no flange to contact with the mandrel and hold it up to the other rolls or center it and also to hold the mandrel perfectly rigid. The object of the present invention is to overcome this difficulty in rolls of this character, while retaining the advantages of the apparatus set forth in said companion application—to wit, the insuring of the proper bending of the blank to be welded around the central mandrel and the polishing of the surface of the blank, such as by a roll having a working face traveling at greater speed than the other rolls.

To this end the invention comprises the combination, with the central mandrel, of a cluster of rolls around same, one of these rolls having annular depressions to receive the flanges of one of the adjoining rolls, so that the rolls can be brought close to each other, and having beyond such depressions flanges extending out and bearing upon the mandrel, so as to center the same, holding the mandrel in proper position with relation to the other rolls in the cluster.

To enable others skilled in the art to make and use our invention, we will describe the same more fully, referring to the accompanying drawings, in which—

Figure 2:
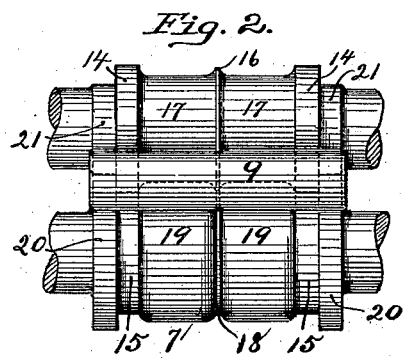
Figure 3:
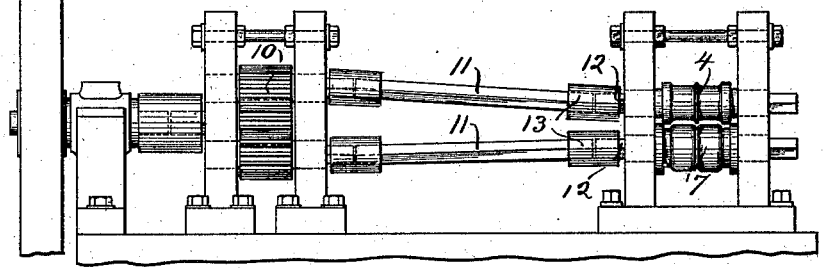

Figure 1 is a cross-section of a welding-machine embodying the invention. Fig. 2 is a cross-section on the line 2 2, Fig. 1; and Fig. 3 is a side view illustrating the way of driving the machine.

The invention is illustrated as having a housing 3, in which are mounted the rolls 4 5, the sliding bearing 8, carrying the rolls 6 7, and the mandrel 9, fitting within the cluster of rolls. The several rolls of the cluster are driven by gearing 10, which connects by the bars 11 with the roll ends 12 through wabblers 13. It is preferred for the purposes of the invention that the roll 7 shall be driven at a greater surface speed than the rolls 4 5 6, and to accomplish this said roll may be made of greater diameter, so that it has a relatively-greater surface speed, though turning the same number of revolutions. The rolls 4 5 6 are provided with the flanges 14, which, as shown, bear upon the mandrel 9 and serve to center the same and hold same rigid, the roll 7 being provided with the annular depressions 15 to receive the flanges 14, and where said rolls are provided for the welding of more than one ring or coupling at a time the rolls 4 5 6 have the annular projections 16 between their working faces 17, while the roll 7 has the annular depression 18 between its working faces 19. Beyond the annular depressions 15 of the roll 7 are annular flanges 20, which, as shown, project out, so as to bear upon the mandrel 9 and serve, with the flanges 14 of the rolls 4 5 6, to center the mandrel, holding it in exact position proper for the welding of the blank around the same. As the working faces 17 and 19 of the rolls 6 and 7 are brought close to each other to prevent the passage of the blank between the same and to insure the wrapping of the blank around the mandrel, as described in said application, the flanges 20 of the roll 7 will naturally project past the flanges 14 of the roll 6, and to provide for this, as clearly shown in Fig. 2, the roll 6 has beyond its outer flanges 14 the annular seats or depressions 21 to receive the annular flanges.

In the forming of rings, bands, or couplings with the apparatus above described the rolls are driven in any suitable way, it being preferred that the roll 7 shall be driven at higher surface speed than the rolls 4, 5, and 6, this being preferably accomplished by forming the roll of greater diameter, as above stated. In welding the blank the mandrel 9 is passed between the rolls and the sliding bearing 8 raised to bring the rolls 6 and 7 into position, after which the blank when at a welding heat is fed over the roll 7 between it and the mandrel 9, and as the blank passes over said roll if it should have a tendency to follow said roll instead of the mandrel it would contact with the roll 7, which is brought close to the roll 6 and which will carry it in proper course to wind around the mandrel 9, this being aided by the greater surface speed of this roll and the roll insuring the proper winding of the blank around the mandrel for welding. As the blank enters the machine the pressure between the mandrel 9 and roll 6 naturally forces the mandrel toward the roll 7; but the outer flanges 20 of said roll 7 confine the mandrel in proper place, holding it central and insuring the proper welding of the blank around the mandrel. In the welding operation the rolls 4, 5, and 6 will of course finish the ends or side edges of the blank, the working faces of the roll 7 only contacting with the outer face thereof; but as said working face 19 is traveling at a greater surface speed it will act to polish the outer face of the finished blank, improving it in finish in this way. After the welding of the blank around the mandrel the sliding bearing 8 is lowered, the mandrel withdrawn, the blank stripped therefrom, and the operation may be repeated.

What we claim as our invention, and desire to secure by Letters Patent, is—

1. In a mill for forming rings or like articles, the combination of a central mandrel and a cluster of rolls around the same, one of said rolls having annular depressions to receive the flanges of the adjoining roll, to bring the working faces of the rolls close to each other, and having beyond said depression annular flanges extending out to and bearing on the mandrel, substantially as set forth.

2. In a mill for forming rings or like articles, the combination of a central mandrel and a cluster of rolls around the same, one of said rolls having annular depressions to receive the flanges of the adjoining roll, to bring the working faces of the rolls close to each other, and having beyond said depressions annular flanges extending out to and bearing on the mandrel, and the other roll having depressions to receive such outer annular flanges.

In testimony whereof we, the said GEORGE W. LA VOO and THOMAS J. BRAY, have hereunto set our hands.

GEORGE W. LA VOO.
THOMAS J. BRAY.

Witnesses:
GRACE C. RAYMOND,
ROBERT C. TOTTEN.